Oct. 31, 1933.  S. B. HASELTINE  1,932,729
FRICTION SHOCK ABSORBING MECHANISM
Filed Aug. 28, 1931
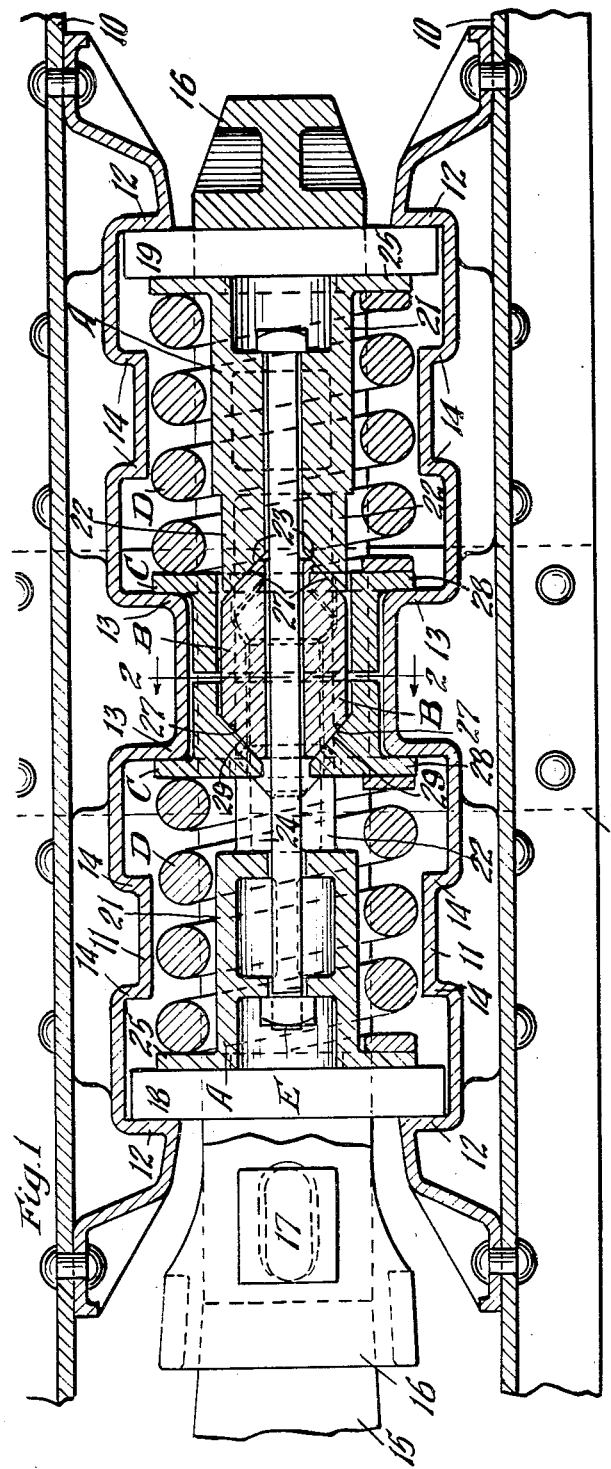
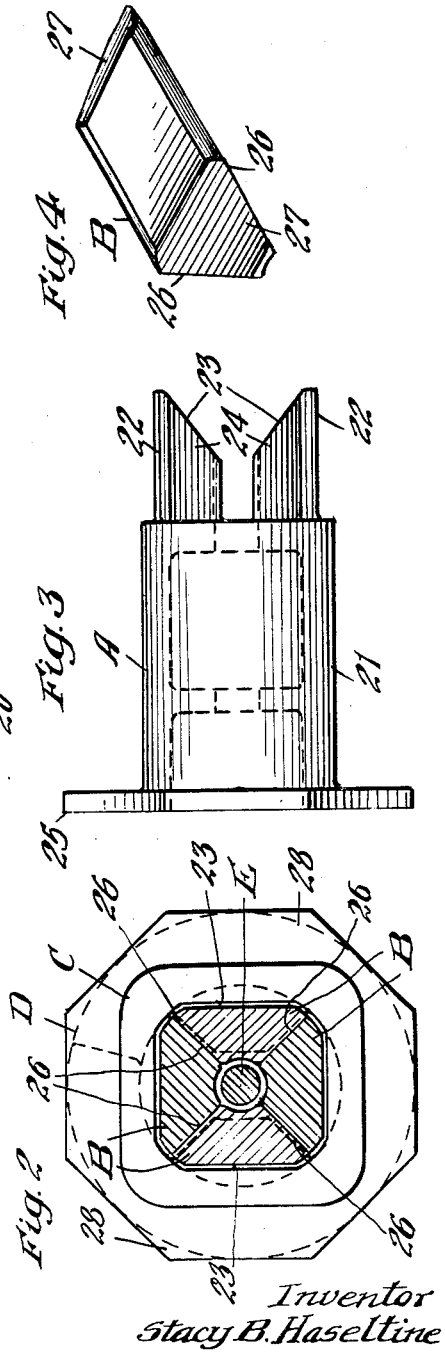
Witness
Wm. Geiger
Inventor
Stacy B. Haseltine
By Henry Fuchs, Atty.

Patented Oct. 31, 1933

1,932,729

UNITED STATES PATENT OFFICE 1,932,729

FRICTION SHOCK ABSORBING MECHANISM

Stacy B. Haseltine, Chicago, Ill., assignor to W. H. Miner, Inc., Chicago, Ill., a corporation of Delaware Application August 28, 1931. Serial No. 559,860

9 Claims. (Cl. 213—22)

This invention relates to improvements in friction shock absorbing mechanisms.

One object of the invention is to provide a friction shock absorbing mechanism of simple design and high capacity which is especially adapted for use in connection with the usual side castings employed in connection with the tandem type of spring gears of railway draft riggings, thereby obtaining greatly increased shock absorbing capacity over that provided by the tandem arrangement of springs.

Another object of the invention is to provide a high capacity friction shock absorbing mechanism, including a central friction unit comprising a plurality of relatively movable sets of friction elements having frictional engagement with each other on friction surfaces extending lengthwise of the mechanism; means for forcing the friction elements against each other into tight frictional engagement and moving the same with respect to each other lengthwise of the mechanism, comprising wedge means at opposite ends of the mechanism having wedging engagement with said sets of elements, respectively; a pair of spring followers opposing movement of said sets of elements with respect to each other and having wedging engagement therewith; and spring members interposed between each wedge means cooperating with one of said sets of elements, and the spring follower cooperating with the other of said sets of elements.

Other and further objects of the invention will more clearly appear from the description and claims hereinafter following.

In the drawing forming a part of this specification, Figure 1 is a horizontal, longitudinal, sectional view through the underframe structure of a railway car, illustrating my improvements in connection therewith. Figure 2 is a transverse vertical sectional view corresponding substantially to the line 2—2 of Figure 1, the side sills and tandem side castings being omitted in this view. Figure 3 is a side elevational view of one of the wedge members employed in connection with my improved mechanism. And Figure 4 is a detailed perspective view of the friction element forming a member of the friction unit employed in connection with my improvements.

In said drawing, 10—10 indicate the usual channel-shaped center or draft sills of the railway car underframe. Side castings 11—11 of well known form are secured to the inner sides of the draft sills. Each side casting is provided with front and rear main stop shoulders 12—12, middle main stop shoulders 13—13 and intermediate limiting stop shoulders 14—14 and 14—14. The coupler, the shank of which only is shown, is indicated by 15 and is connected to a vertical yoke 16 by means of the usual vertical key 17. Front and rear followers 18 and 19 are arranged within the yoke and cooperate with the front and rear main stop shoulders 12—12, respectively. The usual saddle plate 20 is also employed for supporting the yoke 16 within which the shock absorbing mechanism is disposed.

My improved shock absorbing mechanism proper comprises a pair of wedge blocks A—A; two sets of friction elements or shoes B—B and B—B; two spring followers C—C; two spring resistance elements D—D; and a retainer bolt E.

The wedge blocks A—A are arranged at opposite ends of the mechanism, as clearly shown in Figure 1. These blocks are of similar design, each comprising a main body portion 21 of substantially cylindrical cross section and a pair of inwardly projecting spaced arms 22—22. As shown most clearly in Figure 3, the arms 22—22 are provided with opposed wedge faces 23—23 on the inner sides thereof. Each arm 22 is preferably of the cross section shown in Figures 1 and 2, having flat faces 24—24 on opposite sides thereof which are in planes substantially radial to the longitudinal axis of the mechanism. At the outer end, each wedge block A has a flat plate-like section 25 which bears directly on the corresponding follower and forms a spring abutment.

The two sets of friction elements B—B and B—B form a central friction unit which is disposed between the two wedge members A—A. As shown, the friction unit comprises four friction elements which are arranged in pairs, the members of each pair being alternated with the members of the other pair. The friction elements are all of similar design and, as most clearly shown in Figures 1, 2 and 4, each element has a pair of side faces or surfaces 26—26 which are disposed in planes substantially radial to the longitudinal axis of the mechanism. The friction surfaces 26—26 of each element B of one set cooperate with the adjacent friction surfaces 26—26 of the two elements of the other set. As will be evident, the elements comprising the friction unit thus have engagement along cooperating friction surfaces which are disposed lengthwise of the mechanism and in planes radial to the axis thereof. Each element has front and rear wedge faces 27—27. The front wedge faces 27—27 of one pair of friction elements are engaged by the interior wedge faces 23—23 of the front wedge block A, and the rear wedge faces 27—27 of the other pair of elements are engaged by the interior wedge faces 23—23 of the rear wedge A.

The spring followers C—C are of similar design and are arranged at opposite ends of the friction unit comprising the elements B—B. Each spring follower has a flange 28 at the outer end thereof having shouldered engagement with the corresponding middle main stop shoulders 13—13 to hold said follower against inward movement. Inwardly of the flange 28, the spring follower is in the form of a substantially rectangular box-like member and has the box-like section thereof disposed between the offset portions of the stop castings on which the middle main stop shoulders are provided. The inner ends of the spring followers C—C are normally slightly spaced apart, as clearly shown in Figure 1, thereby assuring engagement of the flanges 28 thereof with the middle main stop shoulders 13—13. Each spring follower is provided with two opposed interior wedge faces 29—29 which cooperate with the friction elements B—B. The wedge faces 29—29 of the front spring follower C engage the wedge faces 27—27 of the friction elements B, which have wedging engagement with the rear wedge block A. The wedge faces 29—29 of the rear spring follower C have wedging engagement with the wedge faces 27—27 at the rear ends of the friction elements B—B, which cooperate with the wedge member A at the front end of the mechanism. In this connection, it is pointed out that the projecting arms 22—22 of the two wedge members A—A are spaced apart such a distance as to permit free sliding movement of the friction elements B—B therebetween.

The springs D—D are respectively arranged at the front and rear ends of the mechanism, each comprising a single relatively heavy coil interposed between the flange 25 of the corresponding wedge A and the outer side of the spring follower C at the same end of the mechanism.

The retainer bolt E has its opposite ends anchored to the wedge blocks A—A and serves to hold the device assembled and of uniform overall length. The retainer bolt E is preferably so adjusted as to place the springs D—D under a predetermined initial compression.

The operation of my improved shock absorbing mechanism is as follows: Assuming that a buffing force is applied to the coupler 15, the front follower 18 will be forced rearwardly while the follower 19 is held against movement by the rear stop shoulders 12—12. The wedge A at the forward end of the mechanism will be forced inwardly in unison with the follower 18, thereby wedging the pair of friction elements B—B, engaged thereby, laterally inwardly and forcing the same to slide on the remaining pair of friction elements B—B, rearward movement of which is opposed by the rear wedge A which has wedging engagement with the rear wedge faces 27—27 thereof. During this action, the front spring D will be compressed against the front spring follower C. The pair of elements B—B, which are forced rearwardly by the front wedge A, have wedging engagement at their rear ends with the wedge faces of the rear spring follower C, whereby this spring follower is forced rearwardly, compressing the rear spring C against the flange of the rear wedge A. As will be evident, during this action the longitudinal friction surfaces of the two pairs of friction elements B—B are forced tightly against each other and the friction elements slide relatively to each other lengthwise of the mechanism, thus augmenting the resistance provided by the springs D—D. The compression of the mechanism is limited by engagement of the front follower 18 with the front limiting shoulders 14—14 of the tandem side castings 11—11. During a draft action, the operation is substantially the same as that hereinbefore described with the exception that the front follower 18 remains stationary while the rear follower 19 is moved forwardly. The rear wedge A thus forces the friction elements B—B, engaged thereby, to slide forwardly with respect to the remaining pair of friction elements B—B.

In release of the mechanism, when the actuating force is reduced, the expansive action of the springs D—D forces the wedge members A—A outwardly and the two spring followers C—C inwardly. Through the wedging engagement of the spring followers C—C with the respective members of the two pairs of friction elements B—B and B—B, the latter will be returned to the full release position shown in Figure 1. It will be understood that the movement of the spring followers in release is limited by shouldered engagement of these followers with the middle main stop shoulders 13—13 of the tandem side castings.

From the preceding description taken in connection with the drawing, it will be evident that I have provided an exceedingly simple and efficient friction shock absorbing mechanism which may be readily substituted for the usual tandem springs of a railway draft rigging without alteration or change of the underframe structure, including the draft sills and tandem side castings. It is further pointed out that through the additional resistance provided by the friction unit of my improved mechanism, the capacity of the shock absorbing device is increased greatly over that present in the usual tandem spring gear.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a pair of wedge members disposed at opposite ends of the mechanism and movable relatively toward each other; of friction elements having wedging engagement with said wedge members, respectively, and sliding engagement with each other along cooperating friction surfaces extending lengthwise of the mechanism; a pair of springs opposing movement of said wedge members toward each other and also opposing relative movement of said friction elements lengthwise of the mechanism; and spring followers interposed between said springs and friction elements, said spring followers having wedging engagement with the friction elements.

2. In a friction shock absorbing mechanism, the combination with a pair of wedge members disposed at opposite ends of the mechanism and movable relatively toward each other; of friction elements having wedging engagement with said wedge members, respectively, and sliding engagement with each other along cooperating friction surfaces extending lengthwise of the mechanism; front and rear springs opposing movement of said wedge members toward each other and also opposing relative movement of said friction elements lengthwise of the mechanism; spring followers interposed between said springs and friction elements, said spring followers bearing on the inner ends of said springs; and stop means for limiting relative approach of said spring followers.

3. In a friction shock absorbing mechanism, the combination with a pair of wedge members at opposite ends of the mechanism; of a friction unit between said wedge members, including a plurality of elements movable with respect to each other lengthwise of the mechanism and having frictional engagement with each other, said elements and wedge members having cooperating wedge faces for wedging said elements against each other upon relative movement of said wedge members toward each other; a pair of springs respectively opposing inward movement of said wedge members and also opposing relative movement of said elements lengthwise of the mechanism; and spring followers interposed between said springs and elements and having wedging engagement with the latter.

4. In a friction shock absorbing mechanism, the combination with front and rear wedge members, each having opposed interior wedge faces; of a plurality of longitudinally disposed friction elements between said wedge members, said elements being arranged in sets, the elements of each set having frictional engagement with the elements of the other set, the elements of each set also having front and rear wedge faces, the front wedge faces of one set being engaged by the interior wedge faces of said front wedge block; a spring follower having interior wedge faces engaging the rear wedge faces of said set; a spring resistance interposed between said spring follower and the rear wedge, the interior wedge faces of said rear wedge engaging the rear wedge faces of the other set of elements; a second spring follower having interior wedge faces engaging the front wedge faces of said last named elements; and a second spring resistance interposed between said last named spring follower and the front wedge.

5. In a friction shock absorbing mechanism, the combination with front and rear wedge members, each having opposed interior wedge faces; of a plurality of longitudinally disposed friction elements between said wedge members, said elements being arranged in sets, the elements of one set being alternated with the elements of the other set, the elements of each set having frictional engagement with the elements of the other set on planes radial to the longitudinal axis of the mechanism, the elements of each set having front and rear wedge faces, the front wedge faces of one set being engaged by the interior wedge faces of said front wedge block; a spring follower having interior wedge faces engaging the rear wedge faces of said set of elements; a spring resistance interposed between said spring follower and the rear wedge, the interior wedge faces of said rear wedge engaging the rear wedge faces of the other set of friction elements; a second spring follower having interior wedge faces engaging the front wedge faces of said last named elements; and a spring resistance interposed between said last named spring follower and the front wedge.

6. In a friction shock absorbing mechanism, the combination with front and rear wedge members, each having a pair of opposed interior wedge faces; of a friction unit between said wedge members comprising two pairs of friction elements, said pairs of elements being movable lengthwise of the mechanism with respect to each other, the members of one pair being alternated with the members of the other pair and having frictional engagement with the latter along longitudinal surfaces; a pair of spring followers, each having a pair of opposed interior wedge faces; wedge faces at the front and rear ends of the members of said pairs of friction elements, said front wedge having wedging engagement with the wedge faces at the front ends of the members of one of said pairs of elements, and one of said spring followers having wedging engagement with the wedge faces at the rear ends of the members of said pair of elements, said rear wedge having wedging engagement with the rear wedge faces of the members of the other pair of elements and the other spring follower having wedging engagement with the front wedge faces of said last named elements; and a spring resistance interposed between each wedge and spring follower.

7. In a railway draft rigging, the combination with spaced draft sills provided with tandem stop castings having front and rear main stop shoulders and a pair of middle main stop shoulders; of front and rear followers cooperating with said front and rear main stop shoulders; front and rear wedge members engaging said followers, respectively, each wedge member having a pair of opposed interior wedge faces; a friction unit between said wedge members, said unit comprising two pairs of elements, said pairs of elements being movable lengthwise of the mechanism with respect to each other, the members of one pair of elements being alternated with the members of the other pair and having frictional engagement with the latter along longitudinal surfaces; a pair of spring followers having shouldered engagement with said middle main stop shoulders, respectively, each of said spring followers having a pair of opposed interior wedge faces, the members of each of said pairs of friction elements having wedge faces at the front and rear ends thereof, said front wedge member having wedging engagement with the wedge faces at the front ends of the members of one of said pairs of elements, and one of said spring followers having wedging engagement with the wedge faces at the rear ends of the members of said pair of elements, said rear wedge having wedging engagement with the rear wedge faces of the members of the other pair of elements and the other spring follower having wedging engagement with the front wedge faces of said last named elements; and a spring resistance interposed between each wedge member and spring follower.

8. In a friction shock absorbing mechanism, the combination with a pair of wedge members at opposite ends of the mechanism; of front and rear springs respectively opposing inward movement of said wedge members; a friction unit between said springs, said unit including two sets of friction elements, said sets being movable with respect to each other lengthwise of the mechanism and said friction elements of said sets having frictional engagement with each other; cooperating wedge faces on said elements and wedge members for wedging said elements against each other upon relative movement of said wedge members toward each other; means movable with one of said sets of friction elements bearing on the front end of the rear spring; and means movable with the other set of friction elements bearing on the rear end of the front spring.

9. In a friction shock absorbing mechanism, the combination with a pair of wedge members disposed at opposite ends of the mechanism and movable relatively toward each other; of spring abutments rigid with said wedge members; friction elements having wedging engagement with said wedge members respectively, and sliding engagement with each other along cooperating friction surfaces extending lengthwise of the mechanism; and front and rear springs bearing respectively on the abutments of said wedge members, each of said springs being compressed between the abutment of the corresponding wedge member and the friction elements which have wedging engagement with the other wedge member.

STACY B. HASELTINE.